UNITED STATES PATENT OFFICE.

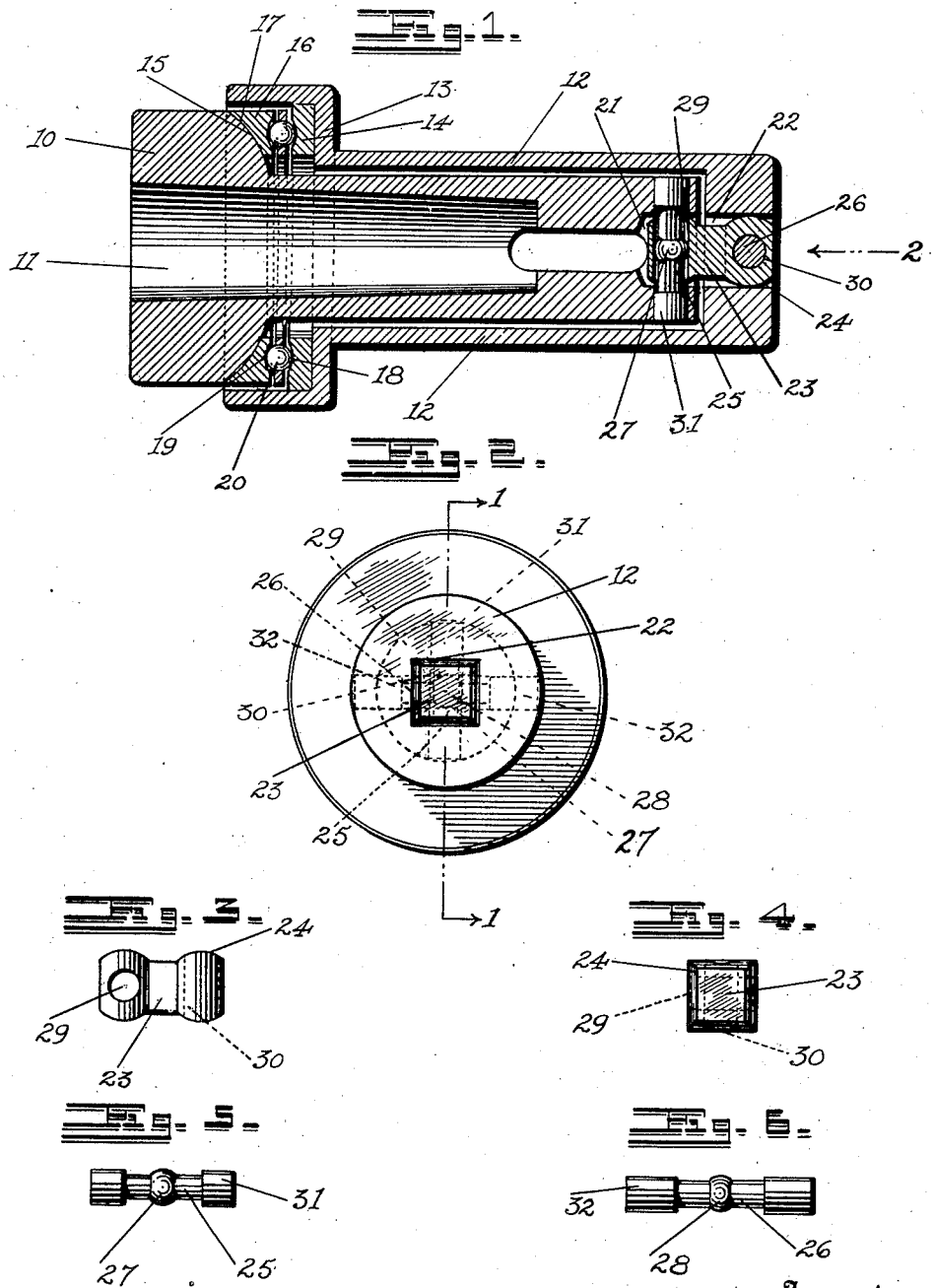

CLARENCE G. CASHMAN, OF WAYNESBORO, PENNSYLVANIA, ASSIGNOR OF ONE-HALF TO JOHN B. EADER, OF WAYNESBORO, PENNSYLVANIA.

FLOATING CHUCK.

1,368,484.

Specification of Letters Patent.

Patented Feb. 15, 1921.

Application filed August 12, 1919. Serial No. 316,960.

*To all whom it may concern:*

Be it known that I, CLARENCE G. CASHMAN, a citizen of the United States, residing at Waynesboro, in the county of Franklin and State of Pennsylvania, have invented certain new and useful Improvements in Floating Chucks, of which the following is a specification.

This invention relates to floating chucks and has for an object to provide a chuck embodying the maximum degree of variation from the axis of rotation within the minimum longitudinal space.

Referring to the accompanying drawings which are made a part hereof and on which similar reference characters indicate similar parts, Figure 1 is a longitudinal sectional view through the improved chuck;

Fig. 2, a view of the improved chuck in end elevation as indicated by arrow 2 at Fig. 1 showing line 1—1 as the plane of Fig. 1;

Fig. 3, a view in side elevation of the universal joint member;

Fig. 4, a view of the universal joint member in end elevation;

Fig. 5, a view of the pivot pin inserted through the chuck member; and

Fig. 6 is a view of the pivot pin inserted through the housing member.

The improved chuck which forms the subject matter of this application comprises a chuck member 10 having an axial tool-receiving opening 11. The chuck member 10 is inclosed within the housing 12 which is adapted to be associated with the power apparatus in the usual well known manner. The housing member 12 has an enlarged offset providing a shoulder 13 upon which is supported a ball ring 14. The chuck member 10 is provided with a spherical segment 15 complementary to a spherical tapered ball ring 16, the spherical taper of the latter being shown at 17. The ball rings 14 and 16 are provided with race-ways 18 and 19 which are struck upon a transverse curvature considerably greater than the balls 20 mounted therein to permit a considerable degree of lateral movement of the ball rings 16 relative to the ring 14 while the spherical contacts 15 and 17 permit of an angular movement of the chuck member 10 relative thereto. To permit of such angular movement and at the same time to provide for positive drive, the chuck member 10 is provided with a square socket 21 and the housing member with a square socket 22, the walls of the two sockets being normally in alinement. Within the sockets 21 and 22 a universal joint member 23 is employed having enlargements formed at its opposite ends in the form of bilges 24 forming a square corresponding substantially with the size of the sockets 21 and 22 so that when seated therein they provide a positive drive from the housing 12 to the chuck member 10 while permitting angular movement upon the pins 25 and 26, the axes of which are the center of curvature of the bilges 24. The pins 25 and 26 are formed with spherical portions 27 and 28, respectively, properly proportioned to fit the openings 29 and 30, respectively, of the member 23, necks being provided upon opposite sides of the spherical enlargements 27 and 28 permitting movement of the member 23 in any and all directions to a limited extent about the spherical portions 27 and 28 but preventing the displacement of the member from the housing and chuck respectively. The pins 25 and 26 are provided with extremities 31 and 32 proportioned to fit into proper openings in the chuck member and housing, respectively, that in the chuck member being shown in the section of Fig. 1.

With the parts assembled in operative relation as indicated at Fig. 1 the reamer, or of course the other tool seated in the socket 11, will be capable of operating with its axis at a considerable variation from that of the housing 12, such variation being provided of course by the movement of the chuck member 10 upon its spherical contact surface, also the lateral movement of the ball ring 16 relative to the ring 14 and accommodated by the universal joint, it being possible of course that the inner end of the chuck member 10 shall depart from concentricity with the bore of the housing member and be positioned eccentric thereto for the purpose of changing the axis of rotation of the chuck member.

Having thus fully described my said invention, what I claim as new and desire to secure by Letters Patent, is:

1. In a chuck a housing provided with an axial bore, a chuck unit provided with a shank smaller than and mounted within said bore, said chuck being provided with a squared socket within its inner end and the housing with a squared opening as a continuation of the bore, the walls of said opening and socket normally registering, a joint member having bilges formed at its opposite ends, the maximum dimensions of which form squares corresponding to and mounted within the squared socket and opening of the chuck member and housing, respectively, and pins inserted in the chuck and housing and through the bilges, the axes of said pins forming the center of curvature of said bilges.

2. In a chuck a housing provided with an axial bore and with a squared opening as a continuation of said bore, a chuck unit smaller than and mounted within said bore and provided with a squared opening, the walls of which are in normal parallelism with the walls of the squared opening of the housing, a connecting member having at its opposite ends bilges, the maximum dimensions of which form squares corresponding to and seated within the squared socket and opening of the chuck and housing, respectively, said connecting member being provided with openings concentric with the curvature of the bilges, and pins inserted within said openings having spherical enlargements corresponding to and seated within the openings of the connecting member and with their ends respectively connected with the housing and chuck member.

3. In a chuck parts movable relative to each other, and a connection comprising a connecting member having bilges formed adjacent its opposite ends, the center of curvature of said bilges being in the major axis of the connecting member and the maximum dimension of said bilges forming squares with openings formed through said ends concentric with the curvature of the bilges and pintles inserted in said openings provided with spherical enlargements at the middle thereof with reduced neck portions upon opposite sides of said spherical enlargement, the said spherical enlargement being proportioned to and fitted within the openings of the connecting member and with the movable parts.

4. In a chuck a connecting member all parts of which are square in transverse section with bilges formed adjacent its opposite ends, the center of curvature of said bilges being in the major axis of said connecting member, and with openings formed within said ends concentric with the curvature of the bilges and pintles having spherical enlargements positioned to engage within the openings positioned concentrically with the curvature of the bilges upon all sides of the connecting member and with reduced neck portions permitting angular movement of said connecting member relative to said pintles.

5. In a chuck a connecting member having openings adjacent its opposite ends and pintles inserted through said openings provided with spherical enlargements fitting said openings, and with reduced portions on opposite sides of said spherical portions permitting angular movement of each pintle and connecting member to depart from the normally perpendicular arrangement of the axes of the connecting member and pintle.

6. In a chuck, a housing provided with a squared opening, a chuck member inserted in the housing and provided with a squared opening, a connecting member having bilges at its opposite ends, square in cross section and with openings therethrough concentric with the curvature of the bilges, said bilged ends being respectively disposed within the squared opening of the housing and chuck member and pins inserted through the housing and chuck member respectively and through the bilges respectively housed by them.

7. In a chuck, a housing having a squared opening, a chuck member disposed within the housing and having a normally alined squared opening, a connecting member having its opposite ends bilged and square in cross sections, inserted within the squared openings of the housing and chuck member respectively, said connecting member also having perforations through the bilges at right angles each opening being concentric with the curvature of its bilge, and pins inserted through the housing and chuck member and through the bilges respectively housed by them, said pins being smaller within than the diameter of the perforations and provided with spherical enlargements concentric with the curvatures of the bilge.

In witness whereof, I have hereunto set my hand and seal at Waynesboro, Pennsylvania, this eighth day of August, A. D. nineteen hundred and nineteen.

CLARENCE G. CASHMAN. [L. S.]

Witnesses:
H. E. CRAIG,
ALF. H. RUSSELL.